United States Patent
Schaeck et al.

(10) Patent No.: US 6,775,398 B1
(45) Date of Patent: Aug. 10, 2004

(54) METHOD AND DEVICE FOR THE USER-CONTROLLED AUTHORISATION OF CHIP-CARD FUNCTIONS

(75) Inventors: Thomas Schaeck, Achern (DE); Thomas Walz, Niefern-Oschelbronn (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/472,452
(22) Filed: Dec. 27, 1999

(30) Foreign Application Priority Data

Dec. 24, 1998  (DE) ......................................... 198 60 177

(51) Int. Cl.$^7$ ................................................. G06K 9/00
(52) U.S. Cl. ........................ 382/124; 235/380; 340/5.83
(58) Field of Search .............................. 382/115, 116, 382/124, 125; 902/3–6; 235/380, 382, 382.5; 713/182, 186; 455/566; 340/5.53, 5.83

(56) References Cited

U.S. PATENT DOCUMENTS

| | | | |
|---|---|---|---|
| 5,144,680 A | * | 9/1992 | Kobayashi et al. ......... 382/124 |
| 5,623,552 A | * | 4/1997 | Lane ........................... 382/124 |
| 5,867,795 A | * | 2/1999 | Novis et al. ................. 455/566 |
| 6,257,486 B1 | * | 7/2001 | Teicher et al. .............. 235/380 |

* cited by examiner

*Primary Examiner*—Vikkram Bali
(74) *Attorney, Agent, or Firm*—Louis P. Herzberg; Anne V. Dougherty

(57) ABSTRACT

The present invention describes a device and a procedure for the user-controlled release of chip-card functions in particular through the input of authentication data. The input of the authentication data takes place by way of an input device of a mobile chip-card reader, particularly one designed as a pocket chip-card reader. The authentication data are checked in the chip-card on the basis of a reference list. If the authentication data agree with the reference-data, a function stored in the non-volatile memory of the chip-card is released. The released function can be specified by number, time and period of validity. The chip-card can then be used in a terminal in accordance with the specified release. The present invention thereby guarantees in a simple manner, that authentication data cannot leave the area under the control of the user's chip-card. Moreover, the authentication ensures that only functions released by the authorization such as, for example, the production of a signature or read or write commands, are executed.

23 Claims, 2 Drawing Sheets

METHOD AND DEVICE FOR THE USER-CONTROLLED AUTHORISATION OF CHIP-CARD FUNCTIONS

FIELD OF THE INVENTION

The present invention describes a procedure and a device to the user-controlled authorisation of chip-card functions.

BACKGROUND OF THE INVENTION

The authorisation and implementation of certain chip-card functions in many cases presupposes the authentication of the communicating parties. For the chip-card, this means, that the chip-card must determine, whether the user of the chip-card or the terminal is an authorised communicating party. This is generally guaranteed by the fact that the communicating parties possess a common secret, that is checked with the aid of an authentication process.

In present-day systems for user authentication, for example, access entitlements to buildings, transaction authentications for banking functions (cash-point, home-banking, telephone banking), mobile phones, etc., a secret, with which the user identifies himself as the authentic user, is given to the user. As a rule, this takes place through the issuance of a PIN or password.

This secret piece of information is verified by the authorising unit (automatic teller, host computer, PC, Internet, etc.). The following problem arises with the checking: the secret shall not be accessible to a stranger, i.e. the secret must be protected as well as possible between input and checking.

All of the components encountered on the transfer route must achieve the same standard of security as individual components. With automatic cash dispensers, for example, the PIN is already coded on the spot in the same physical unit "Encrypting PIN Pad", in order to protect it from unwarranted accesses. This should prevent any attempt to access the PIN at the PIN-keyboard and the following communication components. The possession of this secret piece of information opens up the possibility of an unwarranted authentication for an aggressor, since this secret is portable.

Faced with this background, attempts have been made to use biometrics information for the user authentication. Mention may be made of fingerprint, retinal recognition or facial recognition. These systems offer the advantage, that a body-characteristic of the user, which can be assigned to only one user with high probability and is therefore not transferable, is used for the authentication. This non-transferability and definiteness offers the advantage, that the customer does not himself have to remember the secret and the secret cannot be stolen.

An essential disadvantage of the biometric authentication process is that the biometric values for authentication are not readily available. If the PIN in a system (variable secret) is discovered, a new PIN, which invalidates the old PIN, can be allocated. If a biometric value, for example, a fingerprint, has become accessible, an aggressor has the ability to select a new fingerprint, as a result of which the former fingerprint becomes invalid. The biometric authentication process can be repeated in this case ten times at the most before the biometric fingerprint values of a person is exhausted. It is therefore very risky to employ systems with biometric input systems, where these systems do not meet a very high safety standard.

The security systems currently known can be broken down into the following components:
1. Input medium for entering the authentication value
2. Transfer medium for transmitting the authentication value
3. Check-up position for checking the correctness of the authentication value.

The authentication value, for example PIN, is entered by means of a numerical keypad and is relayed over the network to a host computer. In the host computer, the PIN entered is compared with the reference PIN.

Another embodiment may comprise employing a biometric input in place of the input of a PIN. Here, a fingerprint-sensor in particular can be considered, which refers the finger print data over a network to a host computer, where a comparison check finally takes place.

The protection of the transfer pathway can be effected in distributed systems by technical means. There is always the possibility, however, that a component in the overall system is or will be manipulated. Thus, for example, the value could be "overheard" between fingerprint-sensor and host system and replayed at a later time for an illegal transaction. It is impossible for a user to monitor all of the components of a system.

It is the task of the present invention, therefore, to provide a device and a process, which guarantees the checking in a simple and effective manner of the authenticity of a user to carry out any chip-card functions independent of the implementation of the relevant authentication process.

SUMMARY OF THE INVENTION

The advantages of the present invention reside in the fact that the pocket chip-card reader of the invention for the authorisation of chip-card functions is under the exclusive control of the authorised user. Manipulations of the pocket chip-card reader, particularly the unwarranted authorisation of protected functions, are thereby largely excluded by the authorised party. This applies especially for input of a PIN or with a biometric input. The checking of the correctness of the input PIN takes place in the chip-card over which the authorised user also has exclusive control. The PIN does not leave the control of the authorised user, as a result of which a misuse as well as discovery of the PIN or the biometric value by unauthorised third parties is thereby excluded. The pocket chip-card reader of the invention can be provided with a numerical as well as a biometric input device. The authentication of authorised user leads to the authorisation of the chip-card for certain transactions, that can be limited either by time or by number. This protects the authorised chip-card against permanent misuse third parties.

BRIEF DESCRIPTION OF THE DRAWINGS

The present invention is described on the basis of several examples of embodiments on the basis of the drawings where.

DETAILED DESCRIPTION OF THE INVENTION

Figure 1:
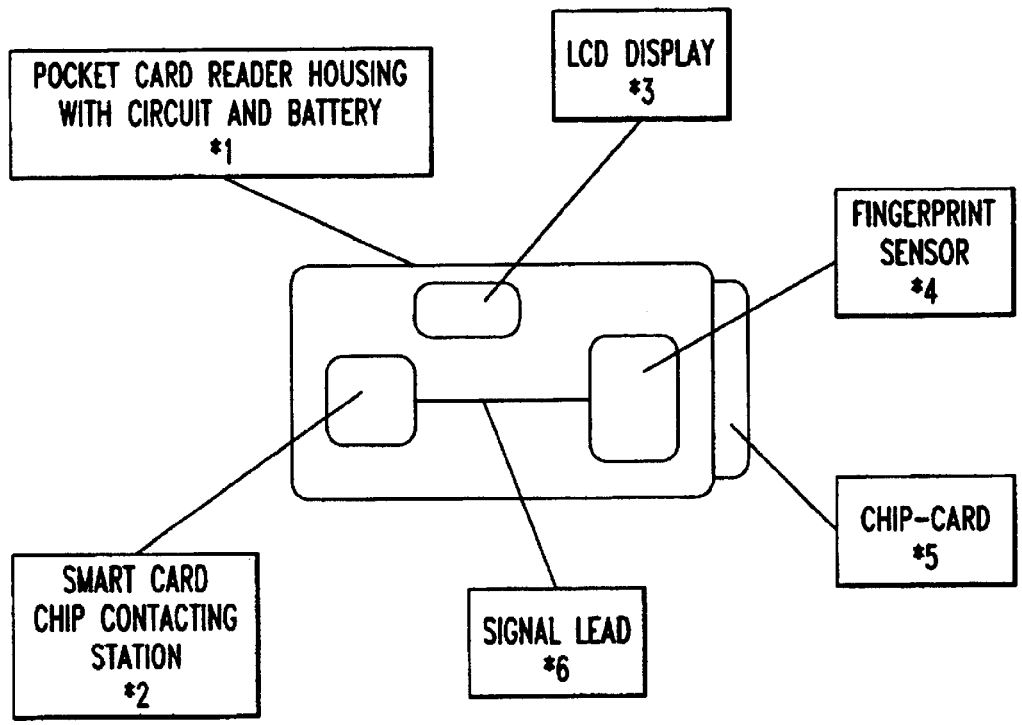
FIG. 1 shows the pocket chip-card reader of the invention with its components.

The pocket chip-card reader of the invention is hereinafter described on the basis of FIG. 1. The pocket chip-card reader 1 preferably consists of a casing with switches, battery and microprocessor. The casing is a plastic-casing preferably in the format of a DIN credit card. The casing contains a micro-switch which, when the chip-card 5 is fully inserted, connects a microprocessor with the battery, whereupon this starts its program.

Communication between microprocessor and chip on the chip-card 5 is effected by way of the chip-card contact station 2. The user is guided by the display 3, which is preferably arranged as an LCD display. After the chip-card has been inserted the input of its authentication data is requested, for example "Input PIN" or "Press finger on sensor".

The fingerprint-sensor 4 records the comparison data from the customer and conveys this by way of the signal conductor 5 to the microprocessor. As finger print sensors, "static" or dynamic sensors may be used. Static use means that the customer presses his finger on the sensor, which must consequently take in the whole surface of the fingertip all at once. Dynamic use means, that the customer must move (draw) his finger over a narrow sensor. The sensor can be made smaller, since it only has to record over a width the size of the fingertip. With the present state of the art, it is possible to produce a fingerprint-sensor based on semiconductors with measurements of less than 20×20 mm. Static sensors are preferred for customer handling and because of the space required.

The integration of a numerical keyboard into the pocket chip-card reader in accordance with the invention also poses no technical problems.

The fingerprint-/PIN Data go directly to the chip-card—without, however, leaving the system in doing so—and is there compared with the securely stored reference data.

The customer can effect an authentication with the pocket chip-card reader in his possession. After input and checking of the fingerprint or the PIN in the chip-card, the chip-card is released for a pre-determined number of commands. Release of commands means altering the state of a chip-card in such a way that, after the change of state, certain functions of the card can be executed for a certain time, a certain frequency of implementation or indefinitely. The release is thus an access-prerequisite for the execution of a chip-card function. With an object (for example a cryptographic key) on a chip-card and a group of commands (for example, the command for generating a digital signature) is associated with a condition, which must be fulfilled before the execution of a command of this group in respect of the object. Such a condition is the successful carrying out of an authentication of the card holder, for example. The released chip-card can be used in a customer terminal. This happens as follows: the chip-card is introduced into the terminal (card reader). A transaction is selected. The terminal makes connection with the chip-card. If the card is released for one or more transaction(s) then these are initiated. If not released, the authentication value must again be entered at the terminal (for example PIN).

If the released chip-card falls into the wrong hands, it can be used at most for the number of released transactions (normally 1–2 transactions are released).

A further protection available here is "time limited authorisation of a transaction". This means, that the chip-card closes to transactions again, if no transactions have taken place in a pre-determined time period after the authorisation. Chip-card applications are, for example, cash card at the bank cash points, Internet banking, home banking, cashpoint, access authorisation, mobile phone activation, health insurance company, petrol stations, credit card, data-access, work station access and laptop access.

If the reference data stored in the chip-card are to be spied out, this must be done for each chip-card, i.e. for each customer with this chip-card. The possibility existing in distributed systems, of displaying the reference-data for a multiplicity of customers, is therefore excluded.

The user-acceptance of this system may be assessed as very positive, since the customer no longer has to completely monitor the authorising system, for example, PC in the Internet cafe, POS terminal in the petrol station, etc.

The user of the present invention is however in a position of being able to monitor fully his authentication hardware. Therefore the pocket chip-card laser in accordance with the invention offers the utmost protection against misuse, since all components are under the exclusive control of the user.

Consequently, the PIN or the biometric authentication data does not extend beyond the pocket chip-card reader in accordance with the invention without the knowledge of the authorised user. Comparison-values, for example, PIN or fingerprint, are stored in a secure environment (chip-card). Implementation as a combination of pocket chip-card reader with fingerprint sensor or with numerical keyboard is possible economically and in a currently feasible environment.

Figure 2:
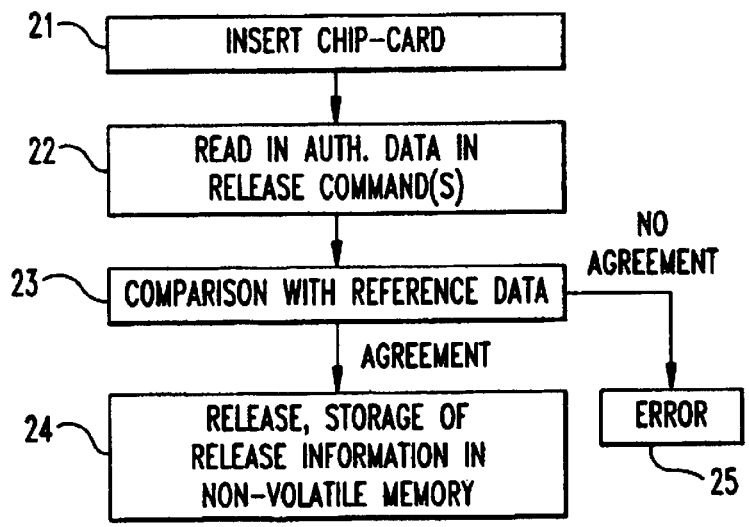
FIG. 2 shows a flow diagram of the pocket chip-card reader of the invention in accordance with FIG. 1.

FIG. 2 shows the mode of operation of the pocket chip-card reader in accordance with the invention in form of a flow diagram. A chip-card becomes released in the pocket chip-card reader of the card owner in order to enable it to be used subsequently in a terminal. With a pocket chip-card reader with fingerprint sensor, this can be implemented as follows: The chip-card is inserted into the reader with fingerprint sensor at 21. The fingerprint characteristics are transferred by a sequence of commands into the chip of the chip-card at 22. This may be the digitised fingerprint itself or a representation already prepared with it for comparison, for example, a field of vectors characteristic of the print. In the chip-card, the detailed data are now compared with reference data at 23, which are stored in a data-area intended for it (for example a file with a file-oriented chip-card or an applet attribute with a Java card).

If the fingerprint agrees with the reference-data, the information that a check was carried out successfully is stored in a non-volatile data area of the chip-card at 24. This is necessary, so that the information is not lost, when the card is removed from the pocket chip-card reader with fingerprint sensor and inserted into a terminal (e.g. a cash dispenser) in which the released function is to be used. If the input information does not agree with the reference data, an error is noted at 25.

The chip-card operating system is designed so that it takes into account, in checking the access conditions before carrying out a card command, any prior authorisations, which were previously stored in the non-volatile memory. This information can be stored as a table, the entries in which may be, for example, tuples of the form:

<Access-condition, function, maximum number of implementations, time, duration, . . . >.

In the following, the release procedure in the pocket card reader in accordance with the invention is shown by means of a concrete implementation:
1. The data for the authentication of the card holder (fingerprint, PIN, retinal scan, etc.) is input.
2. The input data are compared with reference data in the non volatile memory of the card.

3. If there is agreement, the following information is stored in the non-volatile storage of the card:
   access condition (authentication of the card owner), free-switched commands (signature production), number of permitted implementations, time of authorisation and term of authorisation.

These data can be stored in a cyclic file with several records, for example, where new release information always overwrites the oldest. This cyclic file must not be readable. It may only be read by and written to by the card operating system itself.

| +_ Access condition | Released commands | Number of permitted implementations | Time of release | Duration |
|---|---|---|---|---|
| Access condition | Released commands | Number of permitted implementations | Time of release | Duration |
| Access condition | Released commands | Number of permitted implementations | Time of release | Duration |
| Access condition | Released commands | Number of permitted implementations | Time of release | Duration |

Each line of the table shown corresponds to a record in the cyclic file. For example, the access conditions can be encoded in one byte, released commands by one byte for each, the number of implementations by one byte, the time of authorisation by 6 bytes, and the release duration in minutes by two bytes.

Here is a concrete example:

| +_ Authorization by card owner | Production of digital signature | 1 time | 18:39:00 12/08/98 | 10 min |
|---|---|---|---|---|
| Authorization by terminal | Read | 3 times | 18:39:01 12/08/98 | 10 min |
| Authorization by card owner | Read | 1 time | 18:39:02 12/08/98 | 5 min |
| Authorization by terminal | Write | 1 time | 18:39:03 12/08/98 | 5 min |

Figure 3:
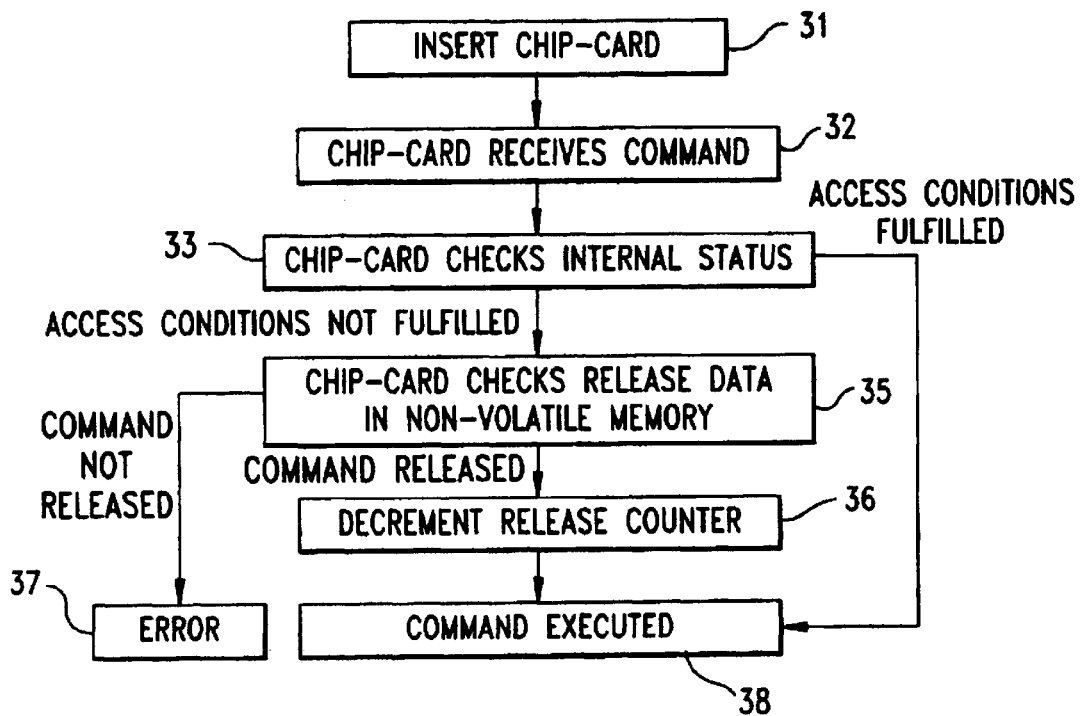
FIG. 3 shows a flow diagram for the authorised chip-card in accordance with FIG. 2 in a terminal.

FIG. 3 shows in the form of a flow diagram how the released chip-card functions in a terminal:
1. Upon card insertion at 31, the card receives a signature-command from an application at 32, which contains the number of the key to be used.
2. The card determines the access conditions that are necessary for the production of a digital signature with this key at step 33.
3. The card tests whether these access conditions are fulfilled. If the access conditions necessitate the use of a key, as in this example, an authentication of the card holder, then the card tests on the basis of the condition represented in the volatile memory, whether an authentication has already been carried out.
4. If the access conditions are fulfilled, here the authentication of the card holder, the card generates a digital signature at 38, otherwise it continues with step 5.
5. The card checks at 35 by reading the relevant area in the non-volatile memory, whether there is a still valid release information for the necessary access condition and the signature function.
6. If there is valid release information for the access condition (here auth. of the card owner) and the card command (here generating a signature), the number of permitted implementations is decremented by one at step 36 in the authorisation information for the command and the command is executed. Alternatively the card sends back an error code to the application at step 37.

Figure 4:
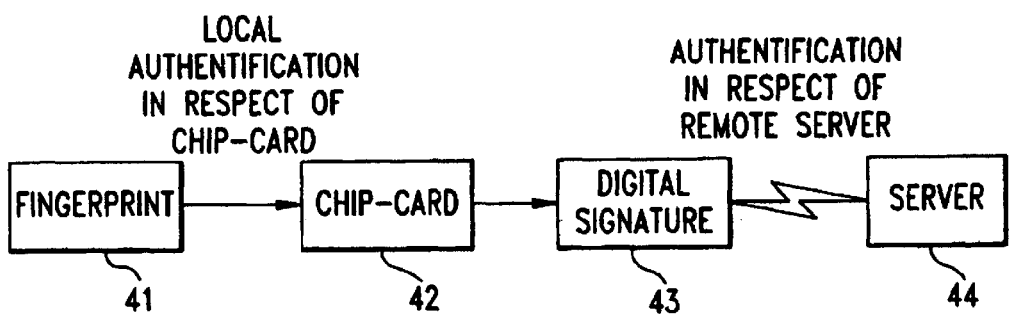
FIG. 4 shows an indirect biometric authentication using the pocket chip-card reader of the invention in accordance with FIG. 1.

FIG. 4 shows an indirect biometric authentication using the pocket chip-card reader of the invention in accordance with FIG. 1. One authenticates oneself not directly by transmitting biometric data (e.g. fingerprint, retinal scan) but by indirect biometric authentication. That is, one authenticates oneself by biometric qualities in respect of the card at 41, whereupon the card is permitted at 42 to generate a digital signature, at 43, which is used for the authentication in respect of the server at 44.

The card only generates signatures if a prior biometric authentication of the owner took place against the card. The advantage with this is that biometric data are never transferred and no biometric reference-data has to be stored on the server. The digital signature can, for example, be an RSA or a DSA signature.

Example: Authentication against a Company-Web-Server in the Internet.
1. The local application scans the fingerprint of the user with the aid of a fingerprint scanner.
2. The local application hands over the fingerprint to the chip-card in a suitable representation.
3. The chip-card checks the fingerprint. After a successful check, it allows the production of digital signatures with the aid of a private key on the card.
4. The application generates a digital signature with the help of the chip-card by way of a random sequence of bytes sent by the server and sends the result for authentication to the server.

During the entire process, the reference-fingerprint never leaves the card.

The invention has been described with reference to several preferred embodiments. It will be clear to one having skill in the relevant art that modifications can be made without departing from the spirit and scope of the invention as set forth in the appended claims.

What is claimed is:

1. Device for the release of chip-card functions comprising:
   a) a portable device for accepting and contacting a chip-card, said chip-card containing at least one function for execution, wherein the function requires an authorisation for implementation;
   b) an input device for the input of authentication data;
   c) a checking and authorising component for establishing the correctness of the authentication data, for authorising at least one function after checking the correctness of the authentication data, and for generating authorisation data for said at least one function, where the checking and authorisation component is installed in the chip-card, and
   d) at least one storage location for storing the authorisation data for said at least one function, said authorisation data being readable at a different chip-card reader at which said at least one function will be performed.

2. Device in accordance with claim 1 wherein the portable device is designed as a pocket chip-card reader and comprises at least a pocket chip-card reader casing, a source of energy, a microprocessor, a volatile and a non-volatile storage, a chip-card contacting station and a communication component for the transmission of the authentication data from the input-device to the chip-card.

3. Device in accordance with claim 2 wherein the pocket chip-card reader additionally comprises a display.

4. Device in accordance with claim 2 wherein the input device is an integrated part of the pocket chip-card reader.

5. Device in accordance with claim 1 wherein the input device is designed as a numeric keypad.

6. Device in accordance with claim 1 wherein the input device is designed as a biometric fingerprint sensor.

7. Device in accordance with claim 4 wherein the input device is designed as a numeric keypad.

8. Device in accordance with claim 4 wherein the input device is designed as a biometric fingerprint sensor.

9. Device in accordance with claim 6 wherein the biometric fingerprint sensor is trained as one of a static and a dynamic sensor.

10. Device in accordance with claim 2 wherein the reference-data is stored in the non-volatile memory of the chip-card and these reference data checked by means of the check-up component upon agreement with the authentication data input.

11. Device in accordance with claim 2 further comprising time checking means whereby a period of validity is defined such that the functions storable in the non-volatile memory of the chip-card must be exercised within the defined period of validity.

12. Device in accordance with claim 10 further comprising time checking means whereby a period of validity is defined such that the functions storable in the non-volatile memory of the chip-card must be exercised within the defined period of validity.

13. Device in accordance with claim 1 wherein the checking and authorising component comprises a release counter, which determines the number of implementations of a function per authorisation.

14. A method for releasing chip-cards where at least one executable function is stored in a non-volatile memory of the chip-card, for the authorisation of which the availability of a defined access-prerequisite is required, comprising the steps of:
 a) introducing the chip-card into a device for the reception and contacting of the chip-card,
 b) entering authentication data by means of an input device;
 c) transferring the authentication data to the chip-card;
 d) comparing the input authentication data with reference data stored in the chip-card; and
 e) generating and storing authorisation data for the release of the function in the non-volatile memory of the chip-card, the availability of which is defined as prerequisite for access for execution of the function at a different chip-card reader, if there is agreement between the input authentication data and the stored reference data.

15. Method in accordance with claim 14 wherein entering authentication data comprises entering a PIN.

16. Method in accordance with claim 14 wherein entering authentication data comprises entering at least one biometric fingerprint value.

17. Method in accordance with claim 14 wherein the data for the release of a function additionally contains data on at least one of the number of implementations of a function, the time of the implementations of a function, and the duration of the implementation of a function.

18. Method in accordance with claim 17 wherein the data for the release of the function are part of the function.

19. Method in accordance with claim 14 wherein the storing of the data for the release of the function to be carried out in accordance with step e) is done in a file in the non-volatile memory of the chip-card, where this file can only be accessed by way of the chip-card operating system.

20. Method in accordance with claim 14 wherein the function to be carried out is a digital signature.

21. Method in accordance with claim 14 wherein the function to be carried out is one of a read and a write command.

22. Method in accordance with claim 14 further comprising the steps of:
 f) introducing the chip-card into a terminal;
 g) receiving an application command to implement one of the functions stored on the chip-card;
 h) checking the authorisation data as access-prerequisite for the implementation of the function;
 i) reducing the number of permitted implementations in said authorisation data by 1, if a release counter is provided for the function to be carried out; and
 j) executing the function if the authorisation data is present.

23. A program storage device readable by machine tangibly embodying a program of instructions executable by the machine to perform method steps for releasing chip-cards where at least one executable function is stored in the non-volatile memory of the chip-card, for the authorisation of which the availability of a defined access-prerequisite is required, said method comprising the steps of:
 a) introducing the chip-card into a device for the reception and contacting of the chip-card;
 b) entering authentication data by means of an input device;
 c) transferring the authentication data to the chip-card;
 d) comparing the input authentication data with reference data stored in the chip-card; and
 e) generating and storing authorisation data for the release of the function in the non-volatile memory of the chip-card, the availability of which is defined as prerequisite for access for execution of the function at a different chip-card reader, if there is agreement between the input authentication data and the stored reference data.

* * * * *